Patented June 29, 1937

2,085,051

UNITED STATES PATENT OFFICE 2,085,051

TREATING GREEN CORN

Robert B. Taylor, near Knoxville, Tenn.

No Drawing. Application October 14, 1936,
Serial No. 105,528

6 Claims. (Cl. 99—193)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to the treatment of green corn for use as a comestible, particularly the removal of the grains of such corn from the cob.

One of the objects of this invention is to prepare green corn ready for final preparation, or preservation, for human consumption. Another object of this invention is to prepare fresh corn by such means that the whole grains are kept intact. Other objects of this invention include the provision for a uniform means for the removal of fresh corn from the cob since all existing methods and devices for accomplishing this purpose are very elaborate and expensive.

In the preparation of green corn, off the cob, for immediate use or preservation, the major portion of the grains of corn are commercially cut from the cob with expensive mechanical equipment. By this procedure it is practically impossible to have the grains so removed entirely free from small portions of the cob due to the natural tapering of the cob as well as the natural irregularities in individual ears. Furthermore, it has not hitherto been possible to actually obtain the whole grains of fresh green corn since only a portion of these grains may be actually removed from the remainder of the grain which is left on the cob. Furthermore, in providing a grade of green corn most suitable for the mechanical cutting of the grains from the cob, it is necessary to have the age of the corn past the stage at which it is generally considered most delectable. In other words, an excess of starchy material has already been developed in the grains.

I have discovered a process for the removal of the grains of green corn from the cob by freezing the ears of green corn to the extent that at least all of the grains of the corn are all frozen and by shelling the whole frozen grains from the cob, whereby the actual whole grain is obtained. It is, furthermore, possible to process grain corn which is not as mature as that required by other processes and is, therefore, more suitable for human consumption.

One example of the operation of my process is given for the treatment of green Golden Bantam corn. The husks and silks were removed from the green ears of corn and any defective portions removed. These partially cleaned ears were immersed in a circulating bath of sodium chloride refrigerant, containing approximately 200 grams of NaCl per liter, maintained at 0 to 10° F., and thereby subjected to a quick freezing until at least all of the grains of corn were completely frozen. The ears of corn, with the frozen grains, were removed from the refrigerant bath and rapidly passed through a mechanical sheller in which the frozen grains of corn were removed completely intact from the cob. These grains were then washed to remove any solid foreign matter and most of the adhering salt solution. The washed grains were then processed in conventional manner by packing in cans, preheating, sealing the cans, and pressure cooking.

It is evident that there are numerous factors which will influence conditions for the most satisfactory operation of my invention, the actual limits of which cannot be established except by a detailed study of each set of raw materials and the intermediate and finished products involved.

The variety of corn used by my process may be any that is ordinarily used for human consumption or which may be found to be suitable for such use, particularly through the advantages inherent in the product.

It is preferable to husk, desilk and remove defective portions of the ears of green corn prior to the freezing of the grains on the cob. However, it is contemplated that the unhusked or partially husked ear may be used after the material is frozen, since, in some instances, it may be easier to remove husks and silks together after the freezing. After the ears are husked and desilked, it is always necessary to remove the defective portions but it is not essential that the ears be actually washed at this time, since this treatment may be made later in the process.

The ears of corn may be frozen by the use of any gaseous, liquid or solid refrigerant which does not add any undesirable constituents or which may be prohibited by law in connection with the preservation of comestibles. It is preferable to use a quick freezing process in which a refrigerant, such as an aqueous solution of salt or sugar or both is used. The ears of corn in which at least the grains proper are completely frozen are removed from the refrigerant solution and may be quickly shelled, either by hand or by use of a mechanical sheller such as is customarily employed in the removal of fully matured corn grains from the cob.

Even though the whole grains are thereby completely removed from the cob intact, a relatively small proportion of these grains may carry with them some very small pieces of the material adjacent to the grain, that is, lying between the grain and the cob, often called "cap". The amount of this material is usually so small that its presence is not noticeable and, therefore, it is unobjectionable, but, whenever it is considered desirable to have strictly the whole grain free from this material, it may be very easily removed mechanically.

The ears of corn may be washed thoroughly after removing any defective portions as indicated above, or the shelled whole grains may be washed to remove any solid foreign material and a portion of or all of the refrigerant adhering thereto.

In standard preserving practice a requisite amount of sodium chloride is added as an aid to preservation as well as for the purpose of rendering the product more palatable. Therefore, using a sodium chloride solution as refrigerant, the grains may be permitted to retain a certain amount of the refrigerant by treatment such as centrifuging, or the residual diluted refrigerant resulting from washing, corresponding to this added salt as required. Furthermore, in the use of some varieties of corn, which are normally of low sugar content, the refrigerant used may be a sugar solution or a mixture of sugar and salt solution with the amount of refrigerant left or remaining after partial washing sufficient to result in a food of the most palatable characteristics.

The shelled grains of corn may be cooked for immediate consumption, may be preserved frozen, preferably in closed containers in an atmosphere substantially free of oxygen, or may be preserved by a conventional procedure, such as packing in a can, preheating, sealing the can, cooking in a pressure cooker, thereby making it available for storage at atmospheric temperature over long periods of time.

It will be seen, therefore, that this invention actually may be carried out by the modification of certain details without departing from its spirit or scope.

I claim:
1. Process for preserving green corn, which comprises, husking, removing silk and cleaning an ear of corn; freezing the cleaned ear of corn to the extent that at least all of the grains of corn are completely frozen; shelling the frozen grains of corn, with all grains substantially completely intact, from the cob; and preserving the shelled grains of corn in a closed container.

2. Process for preserving green corn, which comprises, freezing a cleaned ear of corn to the extent that at least all of the grains of corn are completely frozen; shelling mechanically the frozen grains of corn, with all grains substantially completely intact, from the cob; and preserving the frozen grains in the frozen state.

3. Process for preserving green corn, which comprises, quick freezing cleaned ears of corn in a liquid refrigerant to the extent that at least all of the grains of corn are completely frozen; shelling the frozen grains of corn, with all grains substantially completely intact, from the cobs; and preserving the frozen grains.

4. Process for preserving green corn, which comprises, freezing cleaned ears of corn to the extent that at least all of the grains of corn are completely frozen; shelling the frozen grains of corn, with all grains substantially completely intact, from the cobs; and cooking the frozen grains of corn after removal from the cobs.

5. Steps in process of preserving green corn, which comprises, freezing cleaned ears of corn to the extent that at least all of the grains of corn are completely frozen; and shelling the frozen grains of corn, with all grains substantially completely intact, from the cobs.

6. Steps in process of preserving green corn, which comprises, freezing an ear of corn to the extent that at least all of the grains of corn are completely frozen; and shelling the frozen grains of corn, with all grains substantially completely intact, from the cob.

ROBERT B. TAYLOR.